(12) United States Patent
Murata et al.

(10) Patent No.: US 10,900,468 B2
(45) Date of Patent: Jan. 26, 2021

(54) WIND TURBINE BLADE PROTECTION STRUCTURE AND METHOD OF FORMING THE SAME

(71) Applicant: MITSUBISHI HEAVY INDUSTRIES, LTD., Tokyo (JP)

(72) Inventors: Naoto Murata, Tokyo (JP); Yasutaka Kimura, Tokyo (JP); Eiji Kato, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 104 days.

(21) Appl. No.: 16/218,849

(22) Filed: Dec. 13, 2018

(65) Prior Publication Data
US 2019/0383273 A1    Dec. 19, 2019

(30) Foreign Application Priority Data
Jun. 15, 2018 (JP) .................................. 2018-114342

(51) Int. Cl.
*F03D 80/30* (2016.01)
*F03D 1/06* (2006.01)
*H02G 13/00* (2006.01)

(52) U.S. Cl.
CPC .......... *F03D 80/30* (2016.05); *F03D 1/0675* (2013.01); *H02G 13/80* (2013.01)

(58) Field of Classification Search
CPC .. F03D 80/30; F03D 1/0675; F05B 2240/142; H02G 13/80
See application file for complete search history.

(56) References Cited

U.S. PATENT DOCUMENTS

| | | | | |
|---|---|---|---|---|
| 8,734,110 B2* | 5/2014 | Kuroiwa | ................. | F03D 80/30 416/146 R |
| 8,834,117 B2* | 9/2014 | Yarbrough | .............. | F03D 80/30 416/146 R |
| 8,888,454 B2* | 11/2014 | Hansen | ................. | F03D 1/0675 416/39 |
| 10,141,085 B2* | 11/2018 | Wallenius | ................ | H05B 3/34 |

(Continued)

FOREIGN PATENT DOCUMENTS

| | | | | |
|---|---|---|---|---|
| EP | 1830063 A1 | 9/2007 | | |
| EP | 2889477 A1 * | 7/2015 | ............. | H02G 13/80 |
| EP | 2889476 B1 | 9/2016 | | |

(Continued)

OTHER PUBLICATIONS

Office Action for Japanese Application No. 2018-114342 dated Jul. 2, 2019; 5pp.

*Primary Examiner* — Brian P Wolcott
(74) *Attorney, Agent, or Firm* — Kanesaka Berner and Partners, LLP

(57) ABSTRACT

A lightning-resistance performance of a wind turbine blade is improved with a simple configuration or method. Provided is a wind turbine blade protection structure for protecting a wind turbine blade from lightning, including a protection layer including a conductive metal foil arranged so as to cover at least a part of a surface of the wind turbine blade. The protection layer includes an elongated portion extending in a blade longitudinal direction along a trailing edge of the wind turbine blade from a blade root of the wind turbine blade to a blade tip portion.

14 Claims, 6 Drawing Sheets

(56) References Cited

U.S. PATENT DOCUMENTS

2016/0369110 A1* 12/2016 Huber .................... B64D 45/02
2018/0282953 A1   10/2018 Kanzaki et al.

FOREIGN PATENT DOCUMENTS

| JP | 2012246815 A  | 12/2012 |
| JP | 2015127513 A  | 7/2015  |
| JP | 2014033832 A1 | 8/2016  |
| WO | 2017078130 A1 | 5/2017  |
| WO | 2018095649 A1 | 5/2018  |

* cited by examiner

FIG. 2A
FIG. 2B
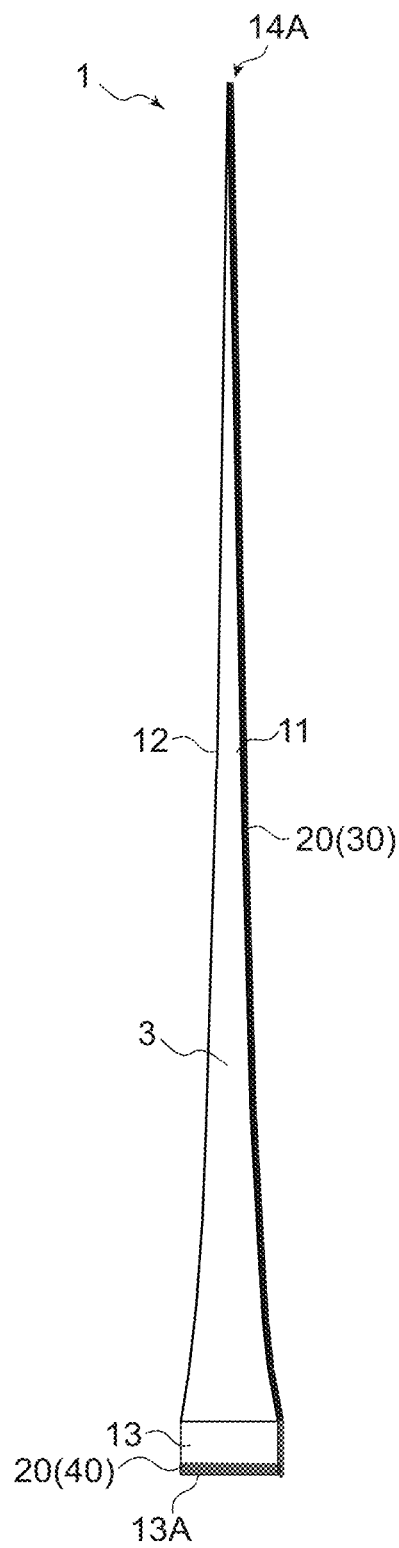
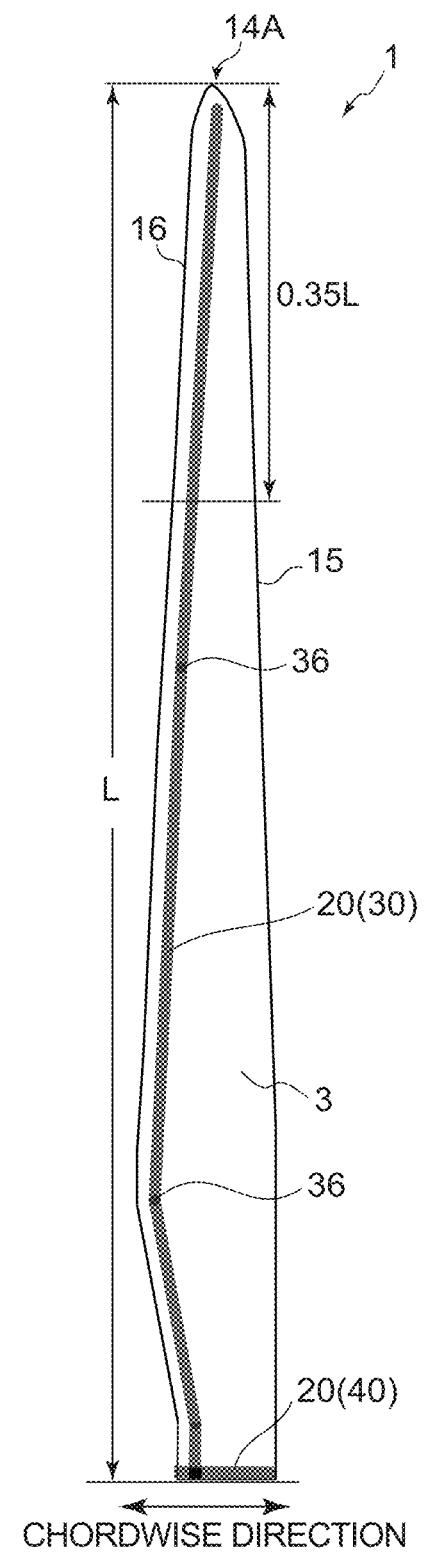
CHORDWISE DIRECTION

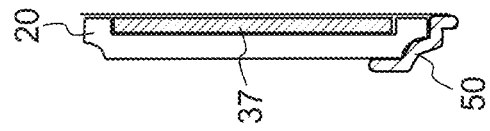
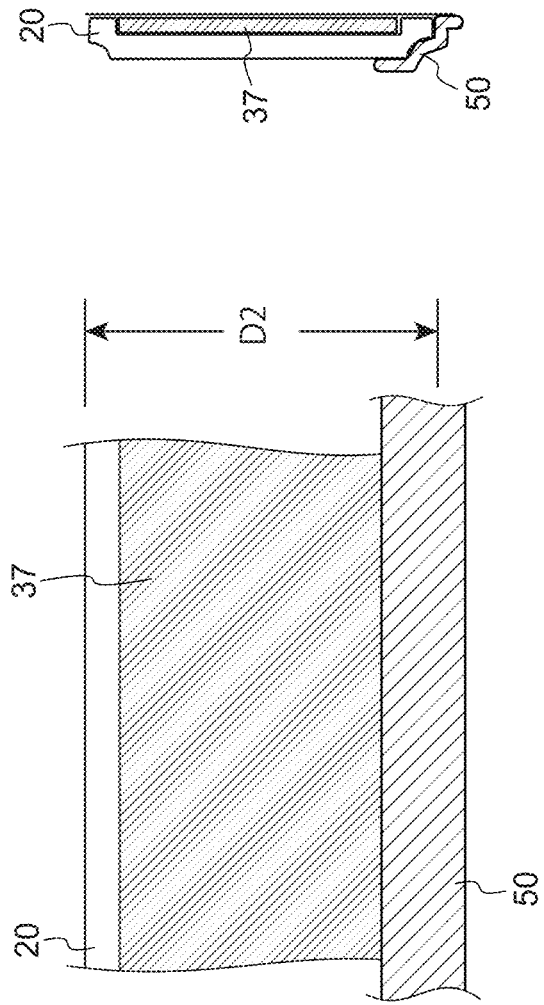

WIND TURBINE BLADE PROTECTION STRUCTURE AND METHOD OF FORMING THE SAME

RELATED APPLICATIONS

The present application claims priority from Japanese Application Number 2018-114342 filed Jun. 15, 2018, the disclosure of which is hereby incorporated by reference herein in its entirety.

TECHNICAL FIELD

This disclosure relates to a wind turbine blade protection structure and a method of forming the same.

BACKGROUND

Various conventional structures for protecting a wind turbine blade from lightning have been known.

Patent Document 1 discloses a lightning protection system including: a lightning receptor that is provided on a blade surface to be freely accessible; a down conductor that is made of a conductive material and extends from the lightning receptor to a blade root, within the blade surface; and a conductive layer electrically isolated from the lightning receptor and the down conductor.

CITATION LIST

Patent Literature

Patent Document 1: U.S. Pat. No. 8,888,454 (Specification)

SUMMARY

Some wind turbine blades are not provided with the metal receptor described above. The metal receptor may be additionally provided to such a wind turbine blade, but this requires a cumbersome remodeling process. Specifically, the metal receptor needs to be exposed on the blade surface, and a down conductor, guiding lightning current to a blade root, needs to be installed in the wind turbine blade. No countermeasure for such an issue is described in Patent Document 1 described above.

In view of the above, an object of at least one embodiment of the disclosure is to improve lightning-resistance performance of a wind turbine blade with a simple configuration or a method.

(1) A wind turbine blade protection structure according to at least one embodiment of the disclosure is a wind turbine blade protection structure for protecting a wind turbine blade from lightning, comprising:

a protection layer including a conductive metal foil arranged so as to cover at least a part of a surface of the wind turbine blade, wherein the protection layer includes an elongated portion extending in a blade longitudinal direction along a trailing edge of the wind turbine blade from a blade root of the wind turbine blade to a blade tip portion.

With the above-described configuration (1), the protection layer including the conductive metal foil extends in the blade longitudinal direction from the blade root to the blade tip portion of the wind turbine blade. Thus, the protection layer itself functions as a lightning receptor, in the blade tip portion with a high risk of being hit by lightning in the wind turbine blade, and functions as a down conductor that guides lightning current, in a portion from the blade tip portion to the blade root. Thus, a wind turbine blade that has been provided or to be newly provided can have functions of both the receptor and the down conductor, with a simple configuration featuring the protection layer provided on the surface of the wind turbine blade, and without requiring an operation inside the wind turbine blade. In other words, the lightning-resistance performance of the wind turbine blade can be improved with a simple configuration. The protection layer is provided along the trailing edge of the wind turbine blade so as to be less susceptible to wind, compared with a case of being provided on the leading-edge side for example. All things considered, a wind turbine blade protection structure that may stably exert the lightning-resistance performance can be provided.

(2) In some embodiments, in the above-described configuration (1), the protection layer may be disposed on a pressure surface of the wind turbine blade.

With the above-described configuration (2), the protection layer can be pressed against the wind turbine blade by means of wind pressure acting on the pressure surface of the wind turbine blade, while the wind turbine is operating. Thus, the wind turbine blade protection structure can be provided that may stably exert the lightning-resistance performance, with the protection layer prevented from peeling off from the wind turbine blade.

(3) In some embodiments, in the configuration (1) or (2), the protection layer may include an annular portion disposed over an entire periphery of a blade root portion of the wind turbine blade so as to be electrically connected to the elongated portion.

In the above-described configuration (3), the protection layer includes the annular portion provided to the blade root portion to be electrically connected to the elongated portion. Thus, the lightning current can be smoothly guided from the blade root portion via a hub to which the blade root portion is attached, regardless of the pitch angle of the wind turbine blade.

(4) In some embodiments, in any one of the above-described configurations (1) to (3), the protection layer may include, on a side of the trailing edge, an end portion disposed away from the trailing edge by a predetermined distance.

In the above-described configuration (4), the protection layer has, on the side of the trailing edge, the end portion disposed away from the trailing edge of the wind turbine blade by the predetermined distance. With this configuration, the end portion of the protection layer on the side of the trailing edge would not protrude toward a trailing side beyond the trailing edge of the wind turbine blade. Furthermore, the protection layer on one of the pressure surface and a negative pressure surface of the wind turbine blade would not be folded to extend on the other one of the surfaces. Thus, the protection layer can be more appropriately prevented from peeling off from the surface of the wind turbine blade.

(5) In some embodiments, in any one of the above-described configurations (1) to (4), the protection layer may include a connection portion including a plurality of protection-layer segments having a predetermined width in a direction which intersects with the blade longitudinal direction, the protection-layer segments being connected in the blade longitudinal direction, and the connection portion may include a first protection-layer segment and a second protection-layer segment disposed on a first side and a second side in the blade longitudinal direction, and respective end portions of the first protection-layer segment and the second protection-layer segment are disposed to face each other, and thereby the conductive metal foils of the respective protection-layer segments are in contact with each other.

In the configuration (5) described above, the protection layer includes the connection portion including the plurality of protection-layer segments connected in the blade longitudinal direction. Thus, the protection layer disposed from the blade root to the blade tip portion can be handled as divided segments instead of a single integrated layer, and thus can be installed with higher operability. The first protection-layer segment and the second protection-layer segment, disposed on the first side and the second side in the blade longitudinal direction, have the respective end portions facing each other, so that the conductive metal foils of the respective protection-layer segments are in contact with each other. Thus, the protection layer itself can be prevented from being thick so as not to largely affect the aerodynamics of the wind turbine blade, and can be prevented from peeling off from the surface of the wind turbine blade due to wind.

(6) In some embodiments, in the above-described configuration (5), the connection portion may include respective joint end portions of the first protection-layer segment and the second protection-layer segment which are joined overlapping with the conductive metal foil attached to a blade surface of the wind turbine blade.

The above-described configuration (6) can more effectively ensure the electrical connection between the first protection-layer segment and the second protection-layer segment in the connection portion, and thus can ensure conductivity of the protection layer from the blade tip portion to the blade root.

(7) In some embodiments, in the above-described configuration (5) or (6), the connection portion may include a synthetic resin tape attached on the first protection-layer segment and the second protection-layer segment so as to cover the respective end portions of the first protection-layer segment and the second protection-layer segment disposed to face each other, the synthetic resin tape having a width greater than the predetermined width in a direction which intersects with the blade longitudinal direction.

With the above-described configuration (7), the synthetic resin tape longer than the width of each of the protection segments can cover each of the joint end portions of the first protection-layer segment and the second protection-layer segment. Thus, each of the protection-layer segments can be effectively prevented from peeling off from the surface of the wind turbine blade, at a joint portion. Furthermore, the conductivity of the protection layer can be ensured from the blade tip portion to the blade root.

(8) In some embodiments, in any one of the configurations (5) to (7), the predetermined width may be from 50 to 300 mm.

In the above-described configuration (8), the effect described in relation to any one of the above-described configurations (5) to (7) can be obtained with the protection-layer segment having the thickness of from 50 to 300 mm.

(9) In some embodiments, in any one of the configurations (1) to (8), the conductive metal thin layer may have a thickness of from 50 to 300 μm.

In the above-described configuration (9), the effect described in relation to any one of the above-described configurations (1) to (8) can be obtained with the conductive metal thin layer having the thickness of from 50 to 300 μm.

(10) In some embodiments, in any one of the configurations (1) to (9), the wind turbine blade protection structure may further comprise, within a range not greater than 35% of a blade length from a blade tip of the wind turbine blade, a separation prevention coating covering a leading-edge side edge portion of the protection layer closer to a leading edge of the wind turbine blade, along the leading-edge side edge portion.

In the above-described configuration (10), within the range not greater than 35% of the blade length from the blade tip of the wind turbine blade, the separation prevention coating covers the leading-edge side edge portion of the protection layer, on the blade-tip side involving a higher circumference speed than the blade-root side. Thus, the leading-edge side edge portion of the protection layer can be appropriately prevented from peeling off from the surface of the wind turbine blade due to wind.

(11) In some embodiments, in any one of the above-described configurations (1) to (10), the conductive metal foil may include a metal tape, a metal mesh, or a metal layer.

In the above-described configuration (11), the effect described in relation to any one of the above-described configurations (1) to (10) can be obtained with the conductive metal foil including a metal tape, a metal mesh, or a metal layer.

(12) A method of forming a wind turbine blade protection structure according to at least one embodiment of the disclosure is a method of forming a wind turbine blade protection structure for protecting a wind turbine blade from lightning and comprises:

a step of arranging a protection layer including a conductive metal foil so as to cover a part of a surface of the wind turbine blade, wherein the step of arranging the protection layer includes arranging the protection layer so as to form an elongated portion extending in a blade longitudinal direction along a trailing edge of the wind turbine blade from a blade root to a blade tip portion of the wind turbine blade.

With the above-described method (12), as described in relation to (1) described above, the protection layer including the conductive metal foil extends in the blade longitudinal direction from the blade root to the blade tip portion of the wind turbine blade. Thus, the protection layer itself functions as a lightning receptor, in the blade tip portion with a high risk of being hit by a lightning in the wind turbine blade, and functions as a down conductor that guides lightning current, in a portion from the blade tip portion to the blade root. Thus, a wind turbine blade that has been provided or to be newly provided can have functions of both the receptor and the down conductor, with a simple configuration featuring the protection layer provided on the surface of the wind turbine blade, and without requiring an operation inside the wind turbine blade. In other words, the lightning-resistance performance of the wind turbine blade can be improved with a simple method. The protection layer is provided along the trailing edge of the wind turbine blade so as to be less susceptible to wind, compared with a case of being provided on the leading-edge side for example. All things considered, the method of forming a wind turbine blade protection structure that may stably exert the lightning-resistance performance can be provided.

(13) In some embodiments, in the above-described method (12), the step of arranging the protection layer may include arranging the protection layer on a pressure surface of the wind turbine blade.

With the above-described method (13), as described in relation to (2) described above, the protection layer can be pressed against the wind turbine blade by means of wind pressure acting on the pressure surface of the wind turbine blade, while the wind turbine is operating. Thus, the method of forming the wind turbine blade protection structure that may stably exert the lightning-resistance performance can be provided, with the protection layer prevented from peeling off from the wind turbine blade.

(14) In some embodiments, in the above-described methods (12) or (13), the step of arranging the protection layer may include arranging the protection layer so as to form an annular portion over an entire periphery of a blade root portion of the wind turbine blade so as to be electrically connected to the elongated portion.

In the above-described method (14), as described in relation to (3) described above, the protection layer includes the annular portion provided to the blade root portion to be electrically connected to the elongated portion. Thus, the lightning current can be smoothly guided from the blade root portion via a hub to which the blade root portion is attached, regardless of the pitch angle of the wind turbine blade.

(15) In some embodiments, in any one of the methods (12) to (14), the step of arranging the protection layer may include arranging the protection layer so as to include a connection portion including a plurality of protection-layer segments each having a predetermined width in a direction which intersects with the blade longitudinal direction, the protection-layer segments being connected in the blade longitudinal direction, and the protection-layer segments of the connection portion may include a first protection-layer segment and a second protection-layer segment disposed on a first side and a second side in the blade longitudinal direction, and respective end portions of the first protection-layer segment and the second protection-layer segment are disposed to face each other, and thereby conductive metal foils of the respective protection-layer segments are in contact with each other.

In the above-described method (15), as described in relation to (5) described above, the protection layer includes the connection portion including the plurality of protection-layer segments connected in the blade longitudinal direction. Thus, the protection layer disposed from the blade root to the blade tip portion can be handled as divided segments instead of a single integrated layer, and thus can be installed with higher operability. The first protection-layer segment and the second protection-layer segment, disposed on the first side and the second side in the blade longitudinal direction, have the respective end portions facing each other, so that the conductive metal foils of the respective protection-layer segments are in contact with each other. Thus, the protection layer itself can be prevented from being thick so as not to largely affect the aerodynamics of the wind turbine blade, and can be prevented from peeling off from the surface of the wind turbine blade due to wind.

At least one embodiment of the disclosure can improve the lightning-resistance performance of a wind turbine blade with a simple configuration or method.

BRIEF DESCRIPTION OF DRAWINGS

FIG. 2A and FIG. 2B are schematic views illustrating a wind turbine blade employing a wind turbine blade protection structure according to one embodiment, FIG. 2A being a diagram as viewed from a trailing edge side and FIG. 2B being a diagram as viewed from a pressure surface side;

FIG. 5A and FIG. 5B are schematic views illustrating an example of a configuration of the wind turbine blade protection structure according to one embodiment, FIG. 5A being a plan view and FIG. 5B being a cross-sectional view.

DETAILED DESCRIPTION

Some embodiments of the disclosure are described with reference to the accompanying drawings. The size, material, shape, other relative arrangements, and the like described in some embodiments below are not intended to limit the scope of the disclosure to these unless otherwise specified, and are merely illustrative.

For example, expressions that represent relative or absolute arrangements such as "in a direction", "along a direction", "parallel", "perpendicular", "center", "concentric", or "coaxial" refer not only to what exactly these expressions represent but also to states that allow tolerance or are relatively displaced by such a degree of angle or distance that can achieve the same functions.

For example, expressions on shapes such as rectangular or cylindrical refer not only to shapes such as rectangular or cylindrical in a geometrically exact sense but also to such shapes that include protrusions, recesses, chamfered parts, or the like as long as the same functions are available.

Expressions that represent "comprising", "including", "being provided with", "with", or "having" one component are not exclusive expressions that would exclude the existence of other component(s).

Figure 1:
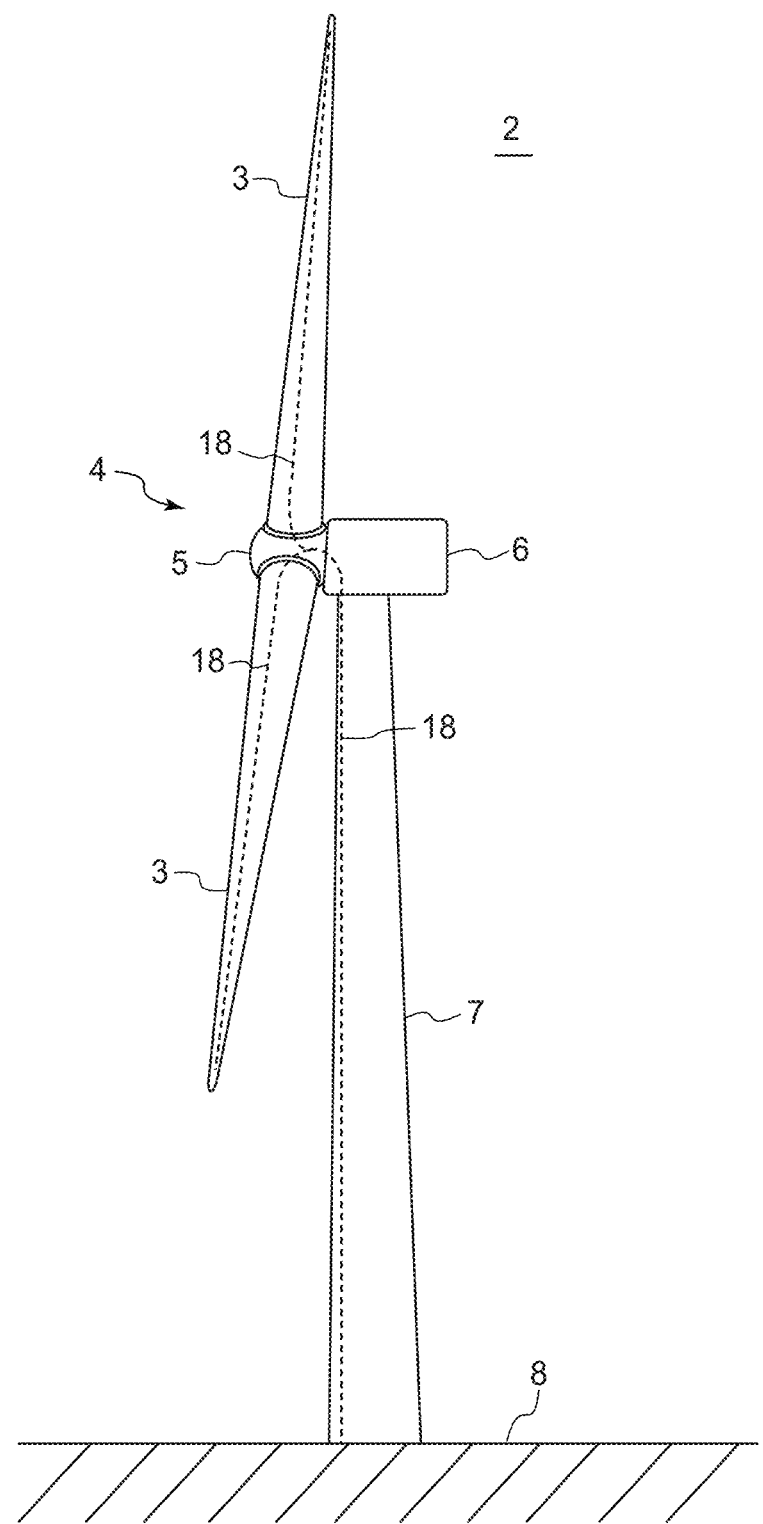
FIG. 1 is a schematic view illustrating a wind power generation facility employing a wind turbine blade protection structure according to one embodiment.
Figure 3:
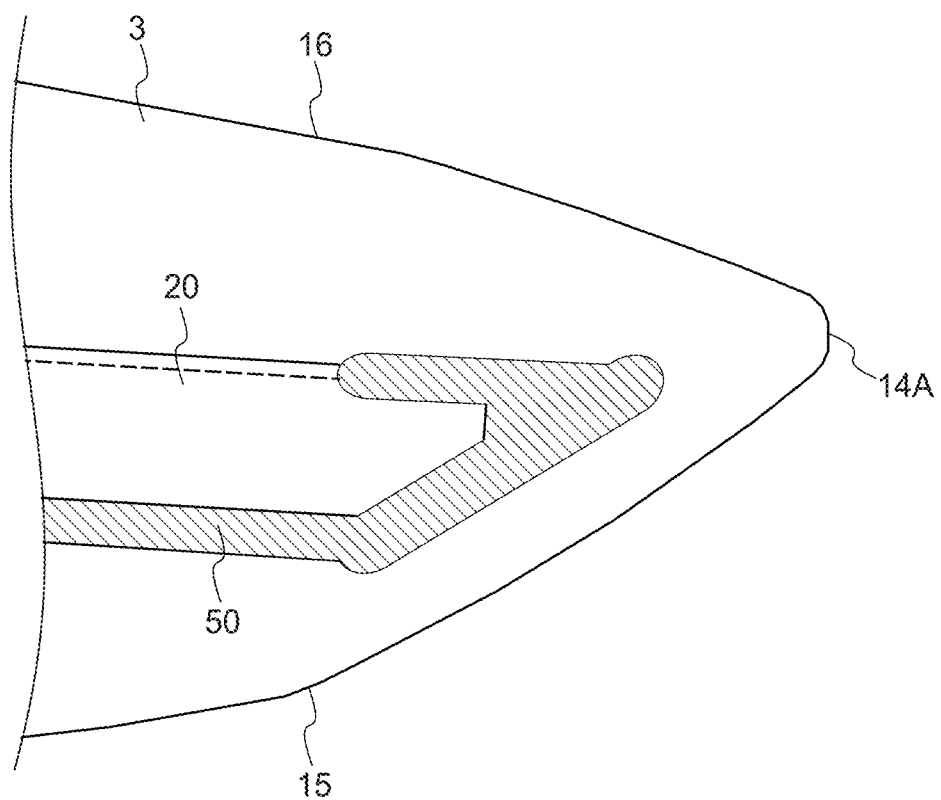
FIG. 3 is a schematic view illustrating an example of a configuration of a wind turbine blade protection structure according to one embodiment.

FIG. 1 is a schematic view illustrating a wind power generation facility employing a wind turbine blade protection structure according to one embodiment.

As in a non-limiting example illustrated in FIG. 1, a wind turbine power generation facility according to at least one embodiment of the disclosure (hereinafter, referred to as a wind turbine 2) includes: a wind turbine rotor 4 including a plurality of (for example, three) wind turbine blades 3 and a hub 5 to which the wind turbine blades 3 are attached; a nacelle 6 that rotatably supports the wind turbine rotor 4 via a main shaft and a main bearing (not illustrated); a tower 7 supporting the nacelle 6 yaw-rotatably; and a base 8 on which the tower 7 is installed.

The wind turbine blades 3 each extend from a blade root portion 13, attached to the hub 5 of the wind turbine 2, to a blade tip portion 14 in a direction (blade longitudinal direction). The wind turbine blade 3 is formed to have a leading edge 15 and a trailing edge 16 extending from the blade root portion 13 to the blade tip portion 14, and have a hollow structure including a pressure surface 11 (also referred to as a positive pressure surface or a ventral surface)

and a suction surface 12 (also referred to as a negative pressure surface or a dorsal surface) opposite to the pressure surface 11.

A "blade longitudinal direction" as used in this specification is a direction between the blade root portion 13 and the blade tip portion 14, and a "chord direction (blade chord direction)" is a direction along a line (chord) between the leading edge 15 and the trailing edge 16 of the wind turbine blade 3. The "blade root portion" is a cylindrical portion of the wind turbine blade 3, with a substantially circular cross-sectional shape. The blade root portion is within a range of 5 m in the blade longitudinal direction from a blade-root-side end surface (typically within a range of 1 to 3 m from the end surface).

FIG. 2A and FIG. 2B are schematic views illustrating a wind turbine blade employing a wind turbine blade protection structure according to one embodiment, FIG. 2A being a diagram as viewed from a trailing edge side and FIG. 2B being a diagram as viewed from a pressure surface side.

As in a non-limiting example illustrated in FIG. 2A and FIG. 2B, a wind turbine blade protection structure 1 according to at least one embodiment of the disclosure is a wind turbine blade protection structure for protecting the wind turbine blade 3 from lightning and includes a protection layer 20 including a conductive metal foil 37 (see FIG. 4A, FIG. 4B, FIG. 5A, and FIG. 5B) arranged so as to cover at least a part of a surface 10 of the wind turbine blade 3.

The protection layer 20 includes an elongated portion 30 extending in the blade longitudinal direction along the trailing edge 16 of the wind turbine blade 3 from a blade root 13A of the wind turbine blade 3 to a blade tip portion 14 (see FIG. 2A and FIG. 2B).

With this configuration, the protection layer 20 including the conductive metal foil 37 extends in the blade longitudinal direction from the blade root 13A to the blade tip portion 14 of the wind turbine blade 3. Thus, the protection layer 20 itself functions as a lightning receptor, in the blade tip portion 14 with a high risk of being hit by lightning in the wind turbine blade 3, and functions as a down conductor that guides lightning current, in a portion from the blade tip portion 14 to the blade root 13A. Thus, a wind turbine blade 3 that has been provided or to be newly provided can have functions of both the receptor and the down conductor, with a simple configuration featuring the protection layer 20 provided on the surface 10 of the wind turbine blade 3, and without requiring an operation inside the wind turbine blade 3. In other words, the lightning-resistance performance of the wind turbine blade 3 can be improved with a simple configuration. The protection layer 20 is provided along the trailing edge 16 of the wind turbine blade 3 so as to be less susceptible to wind, compared with a case of being provided on the leading-edge 15 side for example. All things considered, the wind turbine blade protection structure 1 that may stably exert the lightning-resistance performance can be provided.

In some embodiments, the protection layer 20 may be disposed on a pressure surface 11 of the wind turbine blade 3 (see FIG. 2A and FIG. 2B).

The protection layer 20 thus provided on the pressure surface 11 can be pressed against the wind turbine blade 3 by means of wind pressure acting on the pressure surface 11 of the wind turbine blade 3, while the wind turbine is operating. Thus, the wind turbine blade protection structure 1 can be provided that may stably exert the lightning-resistance performance, with the protection layer 20 prevented from peeling off from the wind turbine blade 3.

In some embodiments, the protection layer 20 may include an annular portion 40 disposed over an entire periphery of a blade root portion 13 of the wind turbine blade 3 so as to be electrically connected to the elongated portion 30 (see FIG. 2A and FIG. 2B).

As described above, the protection layer 20 includes the annular portion provided to the blade root portion 13 to be electrically connected to the elongated portion 30. Thus, the lightning current can be smoothly guided from the blade root portion 13 via the hub 5 to which the blade root portion 13 is attached, regardless of the pitch angle of the wind turbine blade 3.

Figure 6:
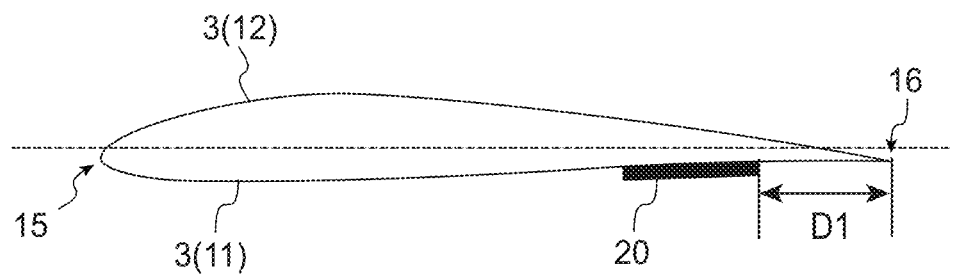
FIG. 6 is diagram illustrating an example of a configuration of a wind turbine blade protection structure according to one embodiment.

In some embodiments, the protection layer 20 may include, on a side of the trailing edge 16, an end portion (trailing-edge side edge portion 32) disposed away from the trailing edge 16 by a predetermined distance (D1 for example) (see FIG. 2B and FIG. 6).

In this configuration, the protection layer 20 has, on the side of the trailing edge 16, the trailing-edge side edge portion 32 disposed away from the trailing edge 16 of the wind turbine blade 3 by the predetermined distance D1. With this configuration, the trailing-edge side edge portion 32 of the protection layer 20 on the side of the trailing edge 16 would not protrude toward a trailing side beyond the trailing edge 16 of the wind turbine blade 3. Furthermore, the protection layer 20 on one of the pressure surface 11 and the negative pressure surface 12 of the wind turbine blade 3 would not be folded to extend on the other one of the surfaces. Thus, the protection layer 20 can be more appropriately prevented from peeling off from the surface 10 of the wind turbine blade 3.

Figure 4A:
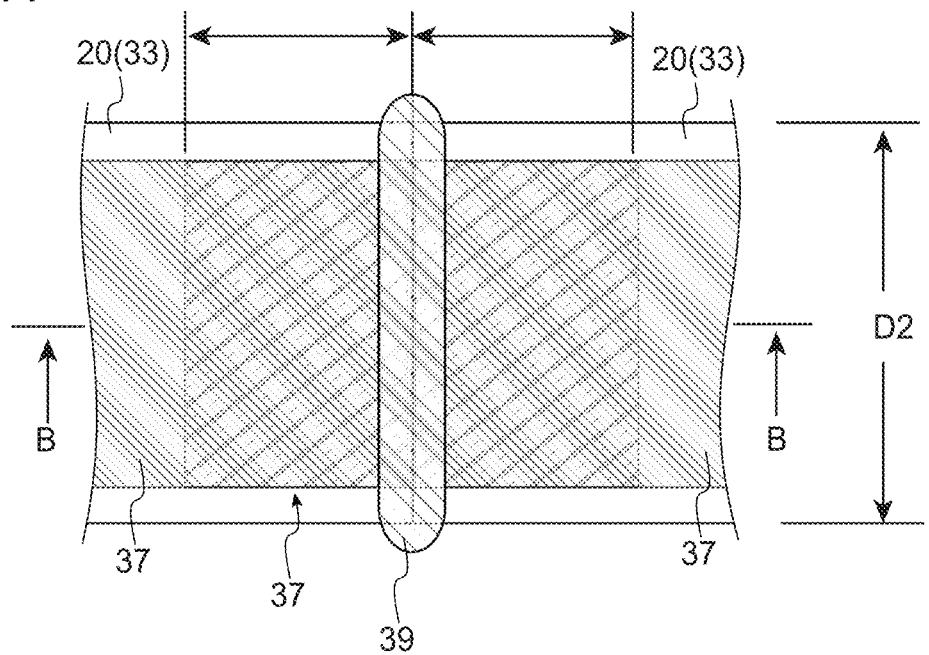
FIG. 4A and FIG. 4B are schematic views illustrating an example of a configuration of a wind turbine blade protection structure according to one embodiment, FIG. 4A being a plan view and FIG. 4B being a cross-sectional view taken along line B-B in FIG. 4A.
Figure 4B:
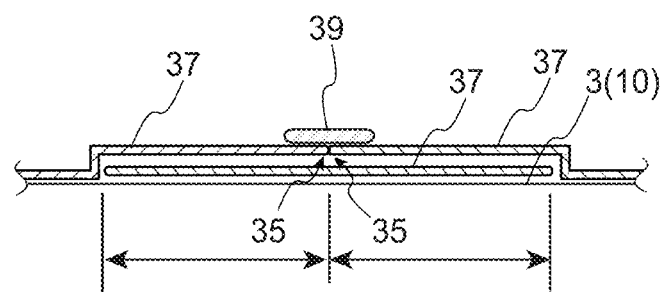

FIG. 4A and FIG. 4B are schematic views illustrating an example of a configuration of a wind turbine blade protection structure according to one embodiment, FIG. 4A being a plan view and FIG. 4B being a cross-sectional view taken along line B-B in FIG. 4A. FIG. 5A and FIG. 5B are schematic views illustrating an example of a configuration of a wind turbine blade protection structure according to one embodiment, FIG. 5A being a plan view and FIG. 5B being a cross-sectional view.

As in a non-limiting example illustrated in FIG. 4A, FIG. 4B, FIG. 5A, and FIG. 5B, the protection layer 20 may include a connection portion 36 including a plurality of protection-layer segments 33 having a predetermined width (D2 for example) in a direction which intersects with the blade longitudinal direction, the protection-layer segments 33 being connected in the blade longitudinal direction (see FIG. 2B).

The connection portion 36 may include a first protection-layer segment 33 and a second protection-layer segment 33 disposed on a first side and a second side in the blade longitudinal direction, and respective end portions of the first protection-layer segment 33 and the second protection-layer segment 33 are disposed to face each other, and thereby the conductive metal foils 37 of the respective protection-layer segments 33 are in contact with each other.

In this configuration, the protection layer 20 includes the connection portion 36 including the plurality of protection-layer segments 33 connected in the blade longitudinal direction. Thus, the protection layer 20 disposed from the blade root 13A to the blade tip portion 14 can be handled as divided segments instead of a single integrated layer, and thus can be installed with higher operability. The first protection-layer segment 33 and the second protection-layer segment 33, disposed on the first side and the second side in the blade longitudinal direction, have the respective end portions facing each other, so that the conductive metal foils 37 of the respective protection-layer segments 33 are in contact with each other. Thus, the protection layer 20 itself can be prevented from being thick so as not to largely affect the aerodynamics of the wind turbine blade 3, and can be prevented from peeling off from the surface 10 of the wind turbine blade 3 due to wind.

In some embodiments, the connection portion 36 may include respective joint end portions 35 of the first protection-layer segment 33 and the second protection-layer segment 33 which are joined overlapping with the conductive metal foil 37 attached to a blade surface 10 of the wind turbine blade 3 (see FIG. 4A and FIG. 4B).

This configuration can more effectively ensure the electrical connection between the first protection-layer segment 33 and the second protection-layer segment 33 in the connection portion 36, and thus can ensure conductivity of the protection layer 20 from the blade tip portion 14 to the blade root 13A.

In some embodiments, the connection portion 36 may include a synthetic resin tape 39 attached on the first protection-layer segment 33 and the second protection-layer segment 33 so as to cover the respective end portions 35 of the first protection-layer segment 33 and the second protection-layer segment 33 disposed to face each other, the synthetic resin tape 39 having a width greater than the width of the protection layer 20 (predetermined width) in a direction which intersects with the blade longitudinal direction (see FIG. 4A and FIG. 4B).

With this configuration, the synthetic resin tape 39 longer than the width of each of the protection-layer segments 33 can cover each of the joint end portions 35 of the first protection-layer segment 33 and the second protection-layer segment 33. Thus, each of the protection-layer segments 33 can be effectively prevented from peeling off from the surface 10 of the wind turbine blade 3, at the connection portion 36. Furthermore, the conductivity of the protection layer 20 can be ensured from the blade tip portion 14 to the blade root 13A.

In some embodiments, the predetermined width D2 of the protection-layer segment 33 may be set to be any width within a range from 50 to 300 mm. In this configuration, the effect of the protection layer 20 described in the disclosure can be obtained with the protection-layer segment 33 having the predetermined width D2 of from 50 to 300 mm.

In some embodiments, the conductive metal foil 37 may have a thickness of from 50 to 300 µm. In this configuration, the effect of the protection layer 20 described in the disclosure can be obtained with the conductive metal foil 37 set to have any thickness within a range from 50 to 300 µm.

In some embodiments, the wind turbine blade protection structure 1 may further comprise, within a range not greater than 35% of a blade length L from a blade tip 14A of the wind turbine blade 3, a separation prevention coating 50 covering a leading-edge side edge portion 31 of the protection layer 20 closer to a leading edge 15 of the wind turbine blade 3, along the leading-edge side edge portion 31 (see FIG. 2B, FIG. 3, FIG. 5A, and FIG. 5B).

In this configuration, within the range not greater than 35% of the blade length L from the blade tip 14A, the separation prevention coating 50 covers the leading-edge side edge portion 31 of the protection layer 20, on the blade-tip 14A side involving a higher circumference speed than the blade-root 13A side. Thus, the leading-edge side edge portion 31 of the protection layer 20 can be appropriately prevented from peeling off from the surface 10 of the wind turbine blade 3 due to wind.

In some embodiments, the conductive metal foil 37 may include a metal tape, a metal mesh, or a metal layer. In this configuration, the effect of the protection layer 20 described in the disclosure can be obtained with the conductive metal foil 37 including a metal tape, a metal mesh, or a metal layer.

Next, a method of forming a wind turbine blade protection structure according to at least one embodiment of the disclosure is described. The method of forming a wind turbine blade protection structure according to at least one embodiment of the disclosure is a method of forming the wind turbine blade protection structure 1 for protecting the wind turbine blade 3 from lightning and includes a step of arranging the protection layer 20 including the conductive metal foil 37 so as to cover a part of the surface 10 of the wind turbine blade 3.

The step of arranging the protection layer 20 includes arranging the protection layer 20 so as to form the elongated portion 30 extending in the blade longitudinal direction along the trailing edge 16 of the wind turbine blade 3 from the blade root 13A to the blade tip portion 14 of the wind turbine blade 3.

With this method, as described above, the protection layer 20 including the conductive metal foil 37 extends in the blade longitudinal direction from the blade root 13A to the blade tip portion 14 of the wind turbine blade 3. Thus, the protection layer 20 itself functions as a lightning receptor 17, in the blade tip portion 14 with a high risk of being hit by a lightning in the wind turbine blade 3, and functions as a down conductor 18 that guides lightning current, in a portion from the blade tip portion 14 to the blade root 13A. Thus, a wind turbine blade 3 that has been provided or to be newly provided can have functions of both the receptor 17 and the down conductor 18, with a simple configuration featuring the protection layer 20 provided on the surface 10 of the wind turbine blade 3, and without requiring an operation inside the wind turbine blade 3. In other words, the lightning-resistance performance of the wind turbine blade 3 can be improved with a simple method. The protection layer 20 is provided along the trailing edge 16 of the wind turbine blade 3 so as to be less susceptible to wind, compared with a case of being provided on the leading-edge 15 side for example. All things considered, a method of forming the wind turbine blade protection structure 1 that may stably exert the lightning-resistance performance can be provided.

In some embodiments, the step of arranging the protection layer 20 may include arranging the protection layer 20 on the pressure surface 11 of the wind turbine blade 3. With this configuration, the protection layer 20 can be pressed against the wind turbine blade 3 by means of wind pressure acting on the pressure surface 11 of the wind turbine blade 3, while the wind turbine is operating. Thus, the method of forming the wind turbine blade protection structure that may stably exert the lightning-resistance performance can be provided, with the protection layer 20 prevented from peeling off from the wind turbine blade 3.

In some embodiments, the step of arranging the protection layer 20 may include arranging the protection layer 20 so as to form the annular portion 40 over an entire periphery of the blade root portion 13 of the wind turbine blade 3 so as to be electrically connected to the elongated portion 30. As described above, the protection layer 20 includes the annular portion provided to the blade root portion 13 to be electrically connected to the elongated portion 30. Thus, the lightning current can be smoothly guided from the blade root portion 13 via the hub 5 to which the blade root portion 13 is attached, regardless of the pitch angle of the wind turbine blade 3.

In some embodiments, the step of arranging the protection layer 20 may include arranging the protection layer 20 so as to include the connection portion 36 including a plurality of protection-layer segments 33 each having the predetermined width D2 in a direction which intersects with the blade longitudinal direction, the protection-layer segments 33 being connected in the blade longitudinal direction, and the protection-layer segments of the connection portion 36 may include a first protection-layer segment 33 and a second protection-layer segment 33 disposed on a first side and a second side in the blade longitudinal direction, and respective end portions of the first protection-layer segment 33 and the second protection-layer segment 33 are disposed to face each other, and thereby conductive metal foils of the respective protection-layer segments 33 are in contact with each other.

In this configuration, the protection layer 20 includes the connection portion 36 including the plurality of protection-layer segments 33 connected in the blade longitudinal direction. Thus, the protection layer 20 disposed from the blade root 13A to the blade tip portion 14 can be handled as divided segments instead of a single integrated layer, and thus can be installed with higher operability. The first protection-layer segment 33 and the second protection-layer segment 33, disposed on the first side and the second side in the blade longitudinal direction, have the respective end portions facing each other, so that the conductive metal foils 37 of the respective protection-layer segments 33 are in contact with each other. Thus, the protection layer 20 itself can be prevented from being thick so as not to largely affect the aerodynamics of the wind turbine blade 3, and can be prevented from peeling off from the surface 10 of the wind turbine blade 3 due to wind.

With at least one embodiment of the disclosure described above, the lightning-resistance performance of the wind turbine blade 3 that has been provided or to be newly provided can be improved with a simple configuration or method.

It should be noted that the disclosure is not limited to the embodiments described above and also includes embodiments with modifications to the embodiments described above and a combination of these embodiments.

The invention claimed is:

1. A wind turbine blade protection structure for protecting a wind turbine blade from lightning, comprising:
   a protection layer including a conductive metal foil arranged so as to cover at least a part of a surface of the wind turbine blade,
   wherein the protection layer includes an elongated portion extending in a blade longitudinal direction along a trailing edge of the wind turbine blade from a blade root of the wind turbine blade to a blade tip portion, wherein
   the wind turbine blade protection structure further comprises, within a range not greater than 35% of a blade length from a blade tip of the wind turbine blade, a separation prevention coating covering a leading-edge side edge portion of the protection layer closer to a leading edge of the wind turbine blade, along the leading-edge side edge portion.

2. The wind turbine blade protection structure according to claim 1,
   wherein the protection layer is disposed on a pressure surface of the wind turbine blade.

3. The wind turbine blade protection structure according to claim 1,
   wherein the protection layer includes an annular portion disposed over an entire periphery of a blade root portion of the wind turbine blade so as to be electrically connected to the elongated portion.

4. The wind turbine blade protection structure according to claim 1,
   wherein the protection layer includes, on a side of the trailing edge, an end portion disposed away from the trailing edge by a predetermined distance.

5. The wind turbine blade protection structure according to claim 1,
   wherein the protection layer includes a connection portion including a plurality of protection-layer segments having a predetermined width in a direction which intersects with the blade longitudinal direction, the plurality of protection-layer segments being connected in the blade longitudinal direction, and
   wherein the plurality of protection-layer segments includes a first protection-layer segment and a second protection-layer segment disposed on a first side and a second side in the blade longitudinal direction, and respective end portions of the first protection-layer segment and the second protection-layer segment are disposed to face each other, and thereby the conductive metal foil of the first protection-layer segment is in contact with the conductive metal foil of the second protection-layer segment.

6. The wind turbine blade protection structure according to claim 5,
   wherein the predetermined width is from 50 to 300 mm.

7. The wind turbine blade protection structure according to claim 1,
   wherein the conductive metal foil layer has a thickness of 50 to 300 μm.

8. The wind turbine blade protection structure according to claim 1,
   wherein the conductive metal foil includes a metal tape, a metal mesh, or a metal layer.

9. A wind turbine blade protection structure for protecting a wind turbine blade from lightning, the wind turbine blade protection structure comprising:
   a protection layer including a conductive metal foil arranged so as to cover at least a part of a surface of the wind turbine blade, wherein
   the protection layer includes an elongated portion extending in a blade longitudinal direction along a trailing edge of the wind turbine blade from a blade root of the wind turbine blade to a blade tip portion,
   the protection layer includes a connection portion including a plurality of protection-layer segments having a predetermined width in a direction which intersects with the blade longitudinal direction, the plurality of protection-layer segments being connected in the blade longitudinal direction,
   the plurality of protection-layer segments includes a first protection-layer segment and a second protection-layer segment disposed on a first side and a second side in the blade longitudinal direction, and
   respective end portions of the first protection-layer segment and the second protection-layer segment are disposed to face each other, and thereby the conductive metal foil of the first protection-layer segment is in contact with the conductive metal foil of the second protection-layer segment; and
   the wind turbine protection structure further comprises an intermediate conductive metal foil attached to a blade surface of the wind turbine blade, with the respective end portions of the first protection-layer segment and the second protection-layer segment overlapping with the intermediate conductive metal foil.

10. A wind turbine blade protection structure for protecting a wind turbine blade from lightning, the wind turbine blade protection structure comprising:
   a protection layer including a conductive metal foil arranged so as to cover at least a part of a surface of the wind turbine blade, wherein
   the protection layer includes an elongated portion extending in a blade longitudinal direction along a trailing edge of the wind turbine blade from a blade root of the wind turbine blade to a blade tip portion,
   the protection layer includes a connection portion including a plurality of protection-layer segments having a predetermined width in a direction which intersects with the blade longitudinal direction with the plurality of protection-layer segments being connected in the blade longitudinal direction,
   the plurality of protection-layer segments includes a first protection-layer segment and a second protection-layer segment disposed on a first side and a second side in the blade longitudinal direction,
   respective end portions of the first protection-layer segment and the second protection-layer segment are disposed to face each other and thereby the conductive metal foil of the first protection-layer segment is in contact with the conductive metal foil of the second protection-layer segment, and
   the connection portion includes a synthetic resin tape attached on the first protection-layer segment and the second protection-layer segment so as to cover the respective end portions of the first protection-layer segment and the second protection-layer segment disposed to face each other, the synthetic resin tape having a width greater than the predetermined width in a direction which intersects with the blade longitudinal direction.

11. A method of forming a wind turbine blade protection structure for protecting a wind turbine blade from lightning, the method comprising:
   a step of arranging a protection layer including a conductive metal foil so as to cover a part of a surface of the wind turbine blade; and
   a step of forming a separation prevention coating covering a leading-edge side edge portion of the protection layer closer to a leading edge of the wind turbine blade, along the leading-edge side edge portion, within a range not greater than 35% of a blade length from a blade tip of the wind turbine blade, wherein
   the step of arranging the protection layer includes arranging the protection layer so as to form an elongated portion extending in a blade longitudinal direction along a trailing edge of the wind turbine blade from a blade root to a blade tip portion of the wind turbine blade.

12. The method of forming a wind turbine blade protection structure according to claim 11,
   wherein the step of arranging the protection layer includes arranging the protection layer on a pressure surface of the wind turbine blade.

13. The method of forming a wind turbine blade protection structure according to claim 11,
   wherein the step of arranging the protection layer includes arranging the protection layer so as to form an annular portion over an entire periphery of a blade root portion of the wind turbine blade so as to be electrically connected to the elongated portion.

14. The method of forming a wind turbine blade protection structure according to claim 11,
   wherein the step of arranging the protection layer includes arranging the protection layer so as to include a connection portion including a plurality of protection-layer segments each having a predetermined width in a direction which intersects with the blade longitudinal direction, the protection-layer segments being connected in the blade longitudinal direction, and
   wherein the protection-layer segments of the connection portion include a first protection-layer segment and a second protection-layer segment disposed on a first side and a second side in the blade longitudinal direction, and respective end portions of the first protection-layer segment and the second protection-layer segment are disposed to face each other, and thereby conductive metal foils of the respective protection-layer segments are in contact with each other.

* * * * *